June 22, 1965  H. E. EVERS ETAL  3,190,614
DEMONSTRATION DEVICE FOR LIFT-TYPE SHOCK ABSORBERS
Filed July 9, 1963
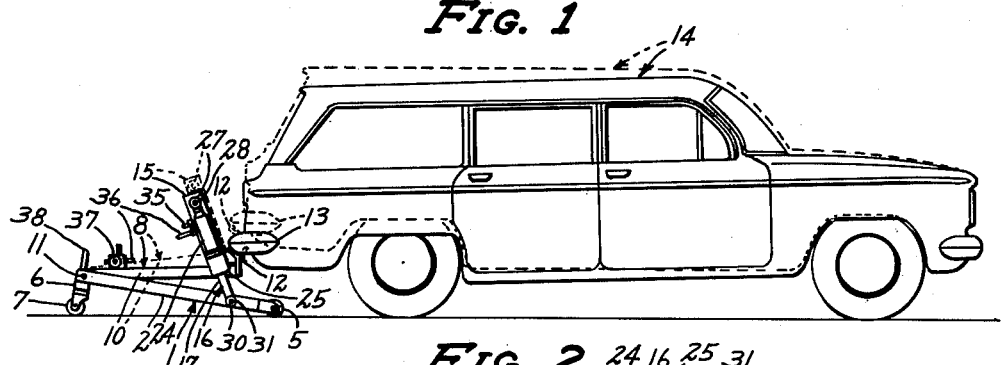
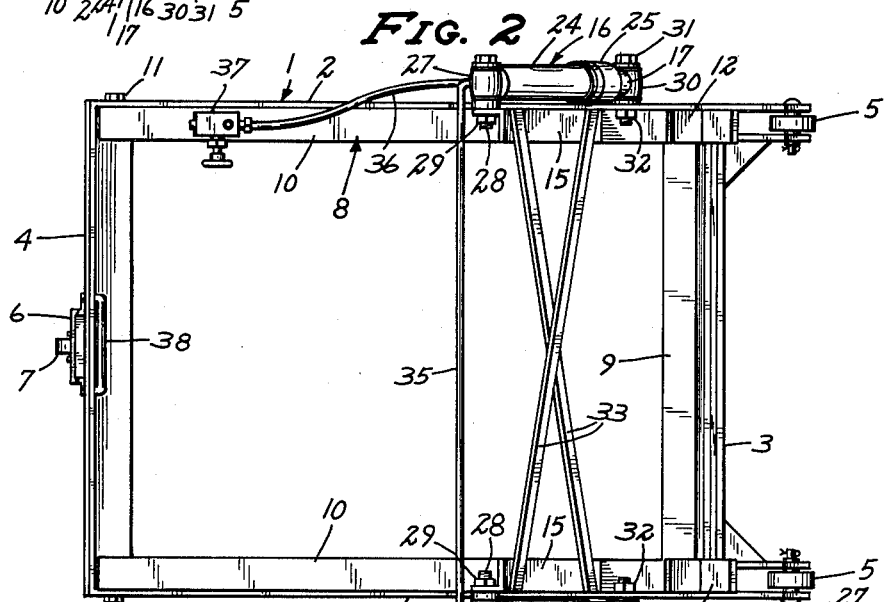
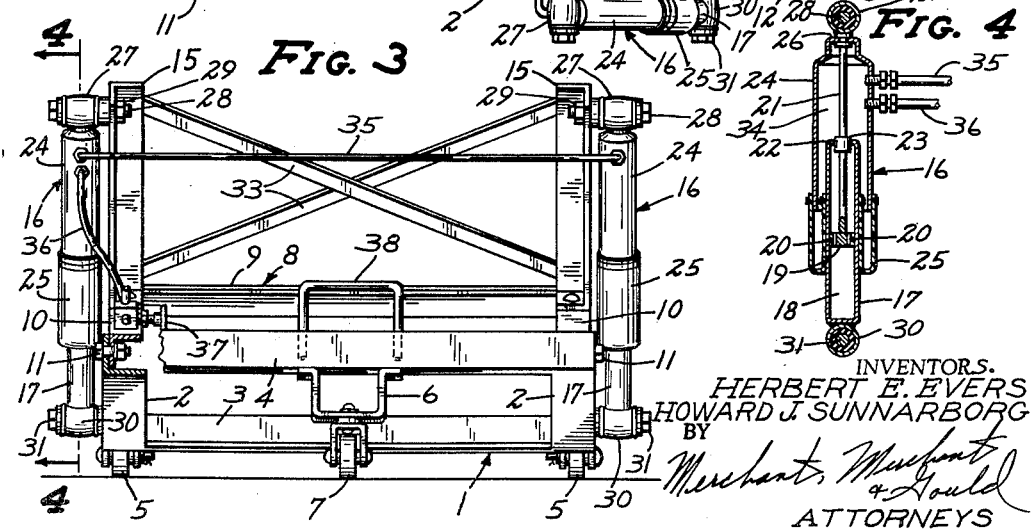
INVENTORS.
HERBERT E. EVERS
HOWARD J. SUNNARBORG
BY
Merchant, Merchant & Gould
ATTORNEYS United States Patent Office 3,190,614
Patented June 22, 1965

3,190,614
DEMONSTRATION DEVICE FOR LIFT-TYPE SHOCK ABSORBERS
Herbert E. Evers, 415 4th St., Cloquet, Minn., and Howard J. Sunnarborg, Box 89, Esko, Minn.
Filed July 9, 1963, Ser. No. 293,825
3 Claims. (Cl. 254—93)

Our invention relates generally to shock absorber testing devices of the lift-type and provides a novel structure wherein a pair of shock absorbers are so mounted on a mobile frame that they may be quickly positioned with respect to a loaded vehicle as to visually demonstrate to the owner thereof precisely how such lift-type shock absorbers would function if installed in conventional manner on said vehicle.

A primary object of our invention is the provision of a device of the type above described which is readily mobile and completely demonstrable.

A further object of our invention is the provision of a device of the class above described which incorporates but a minimum of working parts and is substantially foolproof in its operation.

A further object of our invention is the provision of a device of the class described which may be transported and operated with a minimum of effort and training.

The above and still further objects of our invention will become apparent from the following detailed specification, appended claims, and attached drawings.

Referring to the drawings, wherein like characters indicate like parts throughout the several views:

FIG. 1 is a view in side elevation of a conventional automotive vehicle illustrating our invention in operative position thereon;

FIG. 2 is an enlarged view in top plan showing our novel structure;

FIG. 3 is a view in end elevation as seen from left to right of FIG. 2; and

FIG. 4 is a diagrammatic view in axial section taken substantially on the line 4—4 of FIG. 3.

Referring with greater particularity to the drawings, the numeral 1 indicates in its entirety a generally rectangular base frame the opposite sides of which are identified by 2, the connecting front end by 3, and the transverse rear end by 4. As shown, the extreme forward end portions of the side frame members 2 are so formed as to suitably journal a pair of roller elements or wheels 5. On the other hand, the rear member 4 is provided, intermediate its ends, with a depending U-shaped mounting bracket 6 to which is pivotally secured a castor wheel 7. It will be noted that by this arrangement the base frame 1 inclines upwardly and rearwardly from the wheels 5, for a purpose which will hereinafter be explained.

A U-shaped lifting frame 8 includes a transverse connecting frame member 9 at its front end and a pair of parallel side frame members 10 which are pivotally secured at their free rear ends to the rear end portion of the base frame 1, as indicated at 11. Carried by the front end portion of the lifting frame 8 are a pair of laterally spaced yokes or cradles 12 for reception of the bumper 13 or the like of a conventional automotive vehicle 14. Projecting generally upwardly from the side frame members 9 of the lifting frame 8 rearwardly of the base frame 1 and cradles 12 are a pair of lifting arms 15.

A pair of identical lift-type shock absorbers, such as presently being produced by Delco Products under the trade name "Super Lift," are similarly identified in their entireties by the numeral 16. As shown diagrammatically in FIG. 4, each of the shock absorbers 16 includes a barrel 17 defining an axially elongated chamber 18 for hydraulic fluid. Mounted for extending and retracting movements within the chamber 18 is a rod-equipped piston 19 having restricting orifices 20 therein, the rod 21 projecting axially through the upper end 22 of the barrel 17 and sealed therein with respect thereto by conventional sealing means 23. Telescoped over the upper end portion of the barrel 17 is an inverted cup-like shell 24 which is provided at its lower end with a flexible sealing skirt 25 which extends therebetween and the intermediate portion of the barrel 17. As shown, the shaft or rod 21 also projects through the upper end wall 26 of the shell 24 and is made fast thereto by welding or the like. At their extreme upper ends each of the shafts 21 of the shock absorbers 16 is formed to define an annular bearing 27 through which project the pivot pins 28 having one end fast on one each of the upper end portions of the lifting arms 15, as indicated at 29. At their lower ends the barrels 17 are also formed to define annular bearings 30, each of which are pivotally secured by pins 31 to the longitudinal intermediate portion of the side frame members 2 of the base frame 1, as indicated at 32. Suitable bracing 33 extends between and rigidly supports the lifting arms 15.

It will be noted that the space between the upper end portions 22 of barrels 17 and the upper end portions 26 of the shells 24 define air chambers 34. Interposed between and interconnecting said air chambers 34 is a conduit 35. Air under pressure may be inserted into and released from the chambers 34 by means of a conduit 36 one end of which is connected to one of the chambers 34 and having at its opposite ends suitable valve means 37.

When it is desired to demonstrate to the owner of an overloaded vehicle what lift-type shock absorbers could accomplish with respect to restoring the vehicle from the overloaded full line position of FIG. 1 to the normal dotted line position thereof, a filling station operator, or the like, merely grasps the U-shaped handle 38 which is securely anchored to the rear frame member 4 of the base frame 1 and guides the base frame to a position wherein the wheel-equipped forward end thereof underlies the rear end of the vehicle 14 with the cradle 12 in underlying relationship to the bumper 13. By inserting air under pressure into the conduit 36 through the valve 37, equal amounts of air are caused to enter both air chambers 34 to thereby cause raising-extending movements of the shells 24 with respect to the cooperating barrels 17 to effectively raise the lifting frame 8 and the vehicle 14 carried thereby. The lift-type shock absorbers 16 are then functioning identically as they would if mounted in a conventional manner. Because of the rearward and upward inclination of the base frame 1 a minimum of forward and rearward movement is imparted to the lifting frame 8 and load carried thereby during raising and lowering movements, the latter of which is accomplished by merely releasing the air under pressure from the respective chambers 34 through valve 37.

While obvious, it might here be stated that any portion of a vehicle, such as a trailer hitch or the like, could well be inserted in the cradles 12 in lieu of the bumper 13.

Our invention has been thoroughly tested and found to be completely satisfactory for the accomplishment of the above objects, and while we have shown a preferred embodiment thereof, we wish it to be understood that same may be capable of modification without departure from the scope and spirit of the appended claims.

What is claimed is:

1. In a device for demonstrating the load leveling characteristics of a pair of lift-type shock absorbers of the piston-cylinder type having means associated therewith for introducing a compressible fluid under pressure thereinto and releasing the same therefrom, said device comprising:

(a) a generally rectangular mobile base frame,
(b) a lifting frame having a configuration generally similar to said base frame,
(c) means pivotally securing the rear end portions of said frames together for raising and lowering movements of the front end portion of the latter with respect to the former,
(d) vehicle bumper-receiving cradle means carried by the forward end of said lifting frame rearwardly of said front end portion of said base frame,
(e) laterally spaced upstanding lifting arms carried by the longitudinally intermediate portion of said lifting frame,
(f) means for pivotally securing the upper end portions of one each of one of said shock absorbers to the upper end portions of one each of said arms,
(g) means for pivotally securing the lower end portions of one each of said shock absorbers to the longitudinally intermediate portion of said base frame, and
(h) interconnecting means between said shock absorbers for simultaneously introducing compressible fluid under pressure into and releasing same therefrom to extend and retract same to thereby raise and lower said lifting frame.

2. The structure defined in claim 1 in which the means pivotally securing the rear end portions of said frame together is elevated with respect to the front end portion of said base member whereby to minimize forward and rearward motion imparted to a vehicle in said cradle means during raising and lowering movements thereof.

3. The structure defined in claim 1 in further combination with a pair of laterally spaced roller elements on the front end portion of said base frame, a caster element supporting the rear end of said base frame, and a U-shaped handle on said base frame in overlying relation to said caster element.

References Cited by the Examiner
FOREIGN PATENTS
1,111,799    11/55    France.

WILLIAM FELDMAN, *Primary Examiner.*